Sept. 16, 1958 W. S. MacDONALD 2,852,762

MAGNETIC DRUM MEMORY DEVICES

Filed April 25, 1955

INVENTOR

W.S. MACDONALD

BY Jean C. Chapman

ATTORNEY

United States Patent Office 2,852,762
Patented Sept. 16, 1958

2,852,762

MAGNETIC DRUM MEMORY DEVICES

Waldron S. Macdonald, Concord, Mass., assignor to Electronics Corporation of America, Cambridge, Mass., a corporation of Massachusetts Application April 25, 1955, Serial No. 503,503

3 Claims. (Cl. 340—174)

This invention relates to magnetic drum memory devices. Such devices comprise a magnetic drum having a plurality of parallel circular tracks along the circumference of the drum.

In a typical application, these tracks may be seventy thousandths of an inch wide and separated from each other by a gap having a width of twenty thousandths of an inch, and the drum may comprise five hundred separate tracks. Each track is used to record a specific piece of information. Recording and reading the information on a track is done by means of a standard magnetic recording head. This head has to be positioned accurately with respect to the track on which the information is recorded and spaced about one thousandth of an inch from the surface of the drum.

Some memory devices of this type have been equipped with a fixed recording head for each track on the drum. As recording heads cost several dollars apiece, providing a head for each of, let us say, five hundred tracks results in an expensive device. Other memory devices have been equipped with a single recording head that could be moved from one track to another by means of a servo system. Although this entailed a substantial saving, it resulted in a considerable slowing down of the reading process, as it could take several seconds for the recording head to travel from one track to another widely separated track.

It is an object of this invention to provide a magnetic drum memory device having fewer recording heads than there are tracks on the magnetic drum.

It is another object of this invention to provide a magnetic drum memory device with accurate and fast means to switch a single recording head over a plurality of tracks.

In accordance with the illustrated embodiment of this invention, a plurality of recording heads is affixed to a head support member which is movable along an axis parallel to the axis of said magnetic drum. By moving the head mounting bar, each of the recording heads can cover a plurality of tracks on the magnetic drum.

Other and incidental objects of the present invention will be apparent to those skilled in the art from a reading of the following specification and an inspection of the accompanying drawing in which.

Figures 1, 2, 3:
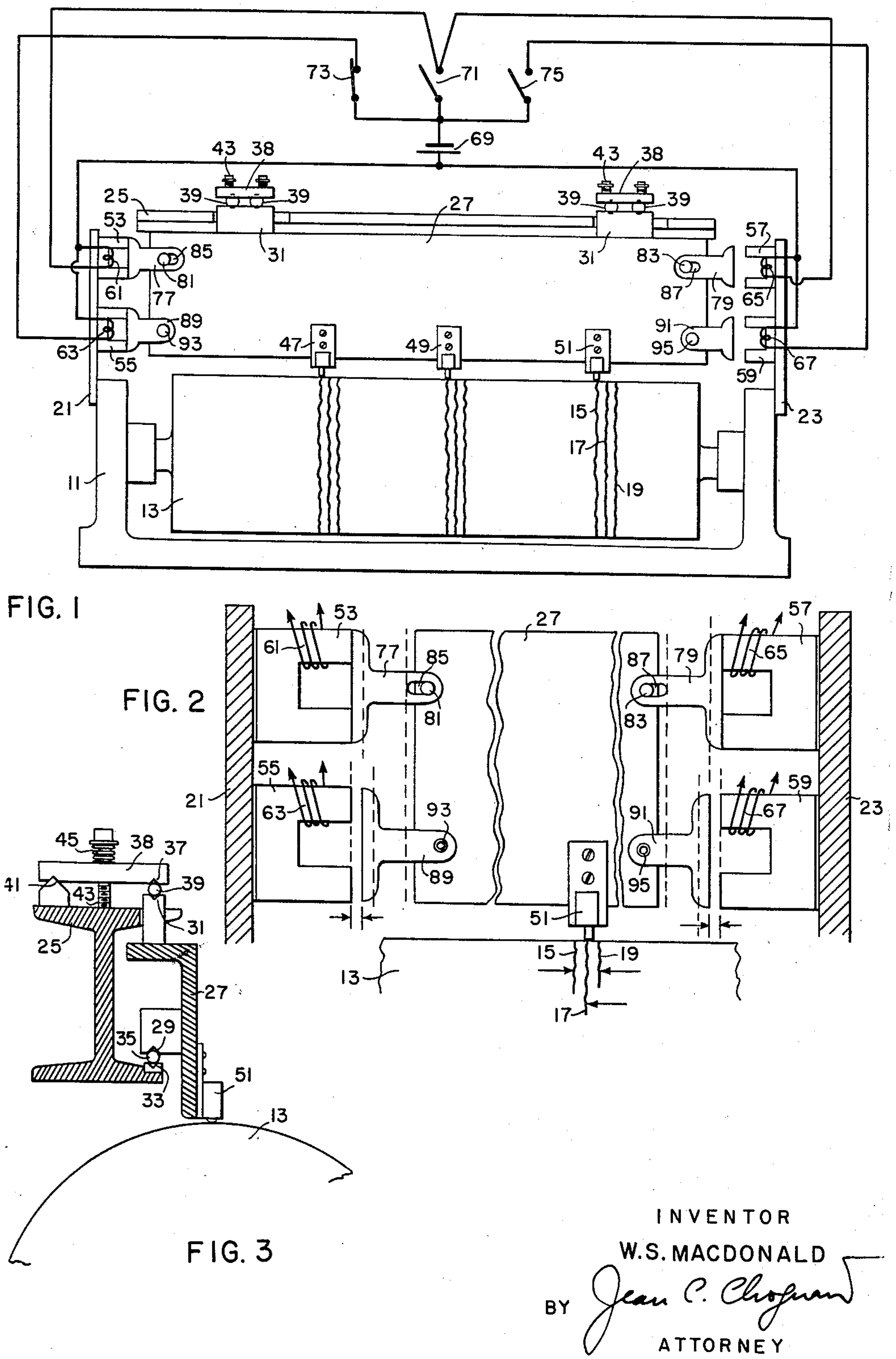
Figure 1 shows a magnetic drum recording device equipped with movable recording heads in accordance with this invention.
Figure 2 is a detailed view of the device of Figure 1 showing the solenoids used to switch the recording heads from one track to another.
Figure 3 is a cross-sectional view of part of the device of Figure 1 showing the mounting means for the recording heads.

Referring to the drawing, there is shown a fixed frame 11 upon which is mounted a magnetic drum 13 rotatable about its axis. The magnetic drum 13 comprises a plurality of tracks, three of which are shown schematically as tracks 15, 17, and 19. Fixedly mounted on frame 11 are frame extensions 21 and 23 and cross-piece 25.

An L-shaped head support bar or member 27 is slidably mounted on the cross-piece 25 as shown in detail in Figure 3. Attached to the head support bar 27 are ball races 29 and 31.

Ball race 29 cooperates with a ball race 33 on cross-piece 25 to form a ball bearing with steel balls 35. Ball race 31 cooperates with a ball race 37 on a clamp block 38 to form a ball bearing with steel balls 39. Ball races 29, 31, 33, and 37 are V-shaped. Clamp block 38 is pivoted on a knife edge 41 and held in place by means of an assembly comprising screw 43 and spring 45.

The head support bar 27 is thus mounted on ball bearings and may be moved longitudinally with respect to the fixed cross-piece 25. To head support bar 27 are affixed a plurality of recording heads, a few of which are shown at 47, 49, and 51. In the embodiment shown in the drawing, each recording head may be moved into three different positions and is thus able to cover three separate adjacent tracks.

Solenoid cores 53 and 55 are fixedly mounted on frame extension 21, and solenoid cores 57 and 59 are fixedly mounted on frame extension 23. Cores 53, 55, 57, and 59 are provided with windings 61, 63, 65, and 67 respectively. Windings 61 and 65 are connected in parallel across a power supply 69 (shown as a battery) through a switch 71. Winding 63 is connected across power supply 69 through a switch 73, and winding 67 is connected across power supply 69 through a switch 75.

Wound cores 53 and 57 are designed to cooperate with armatures 77 and 79 respectively. Armatures 77 and 79 are slidably mounted on the head support bar 27 by means of pins 81 and 83 which engage into slots 85 and 87 located in armatures 77 and 79 respectively. Wound cores 55 and 59 are designed to cooperate with armatures 89 and 91 respectively. Armatures 89 and 91 are fixedly mounted on the head support bar 27 by means of pins 93 and 95.

The head support bar 27 may be switched into three positions, and each recording head may thus be made to cover three separate adjacent tracks. Closing switch 73 (switches 71 and 75 being open) energizes winding 63 on solenoid core 55, causing the armature 89 and the head support bar 27 to move to the left and to be held against core 55, thus positioning the recording head 51 over track 15. Closing switch 75 (switches 71 and 73 being open) energizes winding 67 on solenoid core 59, causing the armature 91 and the head support bar 27 to move to the right and to be held against core 59, thus positioning the recording head 51 over track 19. Closing switch 71 (switches 73 and 75 being open) energizes windings 61 and 65 on solenoid cores 53 and 57, causing armatures 77 and 79 to move against cores 53 and 57 respectively. When armatures 77 and 79 are so positioned, the pins 81 and 83 are located at the ends of slots 85 and 87 remote from cores 53 and 57 respectively, and the head support bar 27 is held in place so that the recording head is positioned over track 17.

Such an arrangement enables each recording head to cover three separate adjacent tracks and results in a substantial saving. It also allows switching from one track to another to be accomplished in a short time interval (of the order of 50 milliseconds) and to the very close tolerances which are necessary. Similar arrangements may be made in which each recording head covers more than three tracks.

I claim:

1. A memory device comprising a fixed frame, a magnetic drum mounted on said fixed frame and rotatable about an axis, a head support member the dimension of which taken in a direction parallel to said axis is approximately equal to that of the magnetic drum taken along said axis, a plurality of magnetic recording heads fixedly mounted on said head support member, and means to move said head support member in a direction parallel to the axis of said magnetic drum and over a distance which is only a small fraction of the length of said drum taken along said axis whereby each of said magnetic heads selectively covers only a small fraction of the length of said drum.

2. A memory device according to claim 1 including means to hold said head support member into a plurality of positions which are fixed with respect to the axis of said magnetic drum.

3. A memory device according to claim 2 wherein the means to move said head support member comprises a solenoid.

References Cited in the file of this patent

UNITED STATES PATENTS

| | | |
|---|---|---|
| 2,416,445 | Jensen | Feb. 25, 1947 |
| 2,528,161 | Miloche | Oct. 31, 1950 |
| 2,579,831 | Keinath | Dec. 25, 1951 |
| 2,614,169 | Cohen et al. | Oct. 14, 1952 |
| 2,683,038 | Saliba et al. | July 6, 1954 |
| 2,733,425 | Williams et al. | Jan. 31, 1956 |
| 2,743,317 | Roberts | Apr. 24, 1956 |